(12) United States Patent
Boren et al.

(10) Patent No.: US 9,108,716 B2
(45) Date of Patent: Aug. 18, 2015

(54) AIRCRAFT HAVING A RECESSED CAVITY IN AN AFT PRESSURE BULKHEAD WALL SURFACE AND A GALLEY MOVED REARWARDLY INTO THE RECESSED CAVITY INCREASING FLOOR SPACE IN FRONT OF THE GALLEY

(71) Applicant: The Boeing Company, Chicago, IL (US)

(72) Inventors: Kelly L. Boren, Marysville, WA (US); Lowell B. Campbell, Mukilteo, WA (US); Alan K. Prichard, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 171 days.

(21) Appl. No.: 13/669,850

(22) Filed: Nov. 6, 2012

(65) Prior Publication Data

US 2014/0124622 A1    May 8, 2014

(51) Int. Cl.
*B64D 11/00* (2006.01)
*B64C 1/10* (2006.01)
*B64D 11/04* (2006.01)

(52) U.S. Cl.
CPC .. *B64C 1/10* (2013.01); *B64D 11/04* (2013.01)

(58) Field of Classification Search
CPC ................... B64C 1/10; B64D 11/04
USPC ....................................... 244/118.5
See application file for complete search history.

(56) References Cited

U.S. PATENT DOCUMENTS

| 4,022,404 | A | * | 5/1977 | Greiss | 244/118.5 |
|---|---|---|---|---|---|
| 4,055,317 | A | * | 10/1977 | Greiss | 244/118.5 |
| 5,062,589 | A | * | 11/1991 | Roth et al. | 244/117 R |
| 5,086,996 | A | * | 2/1992 | Roeder et al. | 244/119 |
| 7,198,228 | B2 | * | 4/2007 | Mills et al. | 244/118.5 |
| 7,562,844 | B2 | * | 7/2009 | Boren | 244/118.5 |
| 7,780,114 | B2 | * | 8/2010 | Doebertin et al. | 244/118.5 |
| 8,469,311 | B2 | * | 6/2013 | Saint-Jalmes et al. | 244/118.5 |
| 2011/0309194 | A1 | * | 12/2011 | Pangalila | 244/118.5 |
| 2012/0085862 | A1 | * | 4/2012 | Pangalila | 244/118.5 |
| 2012/0273614 | A1 | * | 11/2012 | Ehlers et al. | 244/118.5 |
| 2013/0206904 | A1 | * | 8/2013 | Gee et al. | 244/118.5 |
| 2014/0034782 | A1 | * | 2/2014 | Saeltzer et al. | 244/118.5 |
| 2014/0048650 | A1 | * | 2/2014 | Schliwa et al. | 244/118.5 |

* cited by examiner

*Primary Examiner* — Philip J Bonzell
*Assistant Examiner* — Michael Kreiner
(74) *Attorney, Agent, or Firm* — Joseph M. Rolnicki; Evans & Dixon, L.L.C.

(57) ABSTRACT

An aircraft cabin has been reconfigured with a rear fuselage galley and a modified aft pressure bulkhead that enables the galley to be moved rearwardly to provide additional floor space in the aircraft cabin.

22 Claims, 5 Drawing Sheets

AIRCRAFT HAVING A RECESSED CAVITY IN AN AFT PRESSURE BULKHEAD WALL SURFACE AND A GALLEY MOVED REARWARDLY INTO THE RECESSED CAVITY INCREASING FLOOR SPACE IN FRONT OF THE GALLEY

FIELD OF THE INVENTION

The present invention pertains to an aircraft cabin that has been reconfigured to increase the floor space of the aircraft cabin. In particular, the present invention pertains to an aircraft cabin having a rear fuselage galley and a modified rear bulkhead that enables the galley to be moved rearwardly to provide additional floor space inside the cabin.

BACKGROUND

Commercial aircraft set up for the transportation of passengers typically include rows of seats along the length of the aircraft cabin and one or more aisles that extend the length of the aircraft between the rows of seats. Some aircraft have a cross aisle at the rear of the aircraft that extends between a pair of boarding doorways in the opposite sides of the aircraft and a galley at the rear of the aircraft adjacent the cross aisle. The traditional positioning of the galley in the aircraft cabin often requires that a portion of the galley project out into the cross aisle of the aircraft cabin. Thus, the galley can prove to be an impediment to passengers comfortably moving along the cross aisle when boarding or exiting the aircraft.

SUMMARY

The aircraft of the present invention overcomes the disadvantages associated with prior art aircraft having galleys that project into a cross aisle as discussed above. This is accomplished by reconfiguring the aft pressure bulkhead of the aircraft to enable the galley of the aircraft to be moved rearwardly of the cross aisle. This increases the floor space of the aircraft The aft pressure bulkhead of the aircraft of the invention is redesigned with a recessed cavity in a central area of the bulkhead. The recessed cavity is aligned with the galley of the aircraft cabin and is dimensioned to receive portions of the galley. This enables the galley to be positioned rearwardly of the cross aisle and rearwardly of the boarding doors at the laterally opposite ends of the cross aisle. The galley being moved rearwardly of the cross aisle provides clear access to the two boarding doors at the opposite ends of the cross aisle and increases the floor space of the aircraft.

The features, functions, and advantages that have been discussed can be achieved independently in various embodiments or may be combined in yet other embodiments, further details of which can be seen with reference to the following description and drawings.

DESCRIPTION

Figure 1:
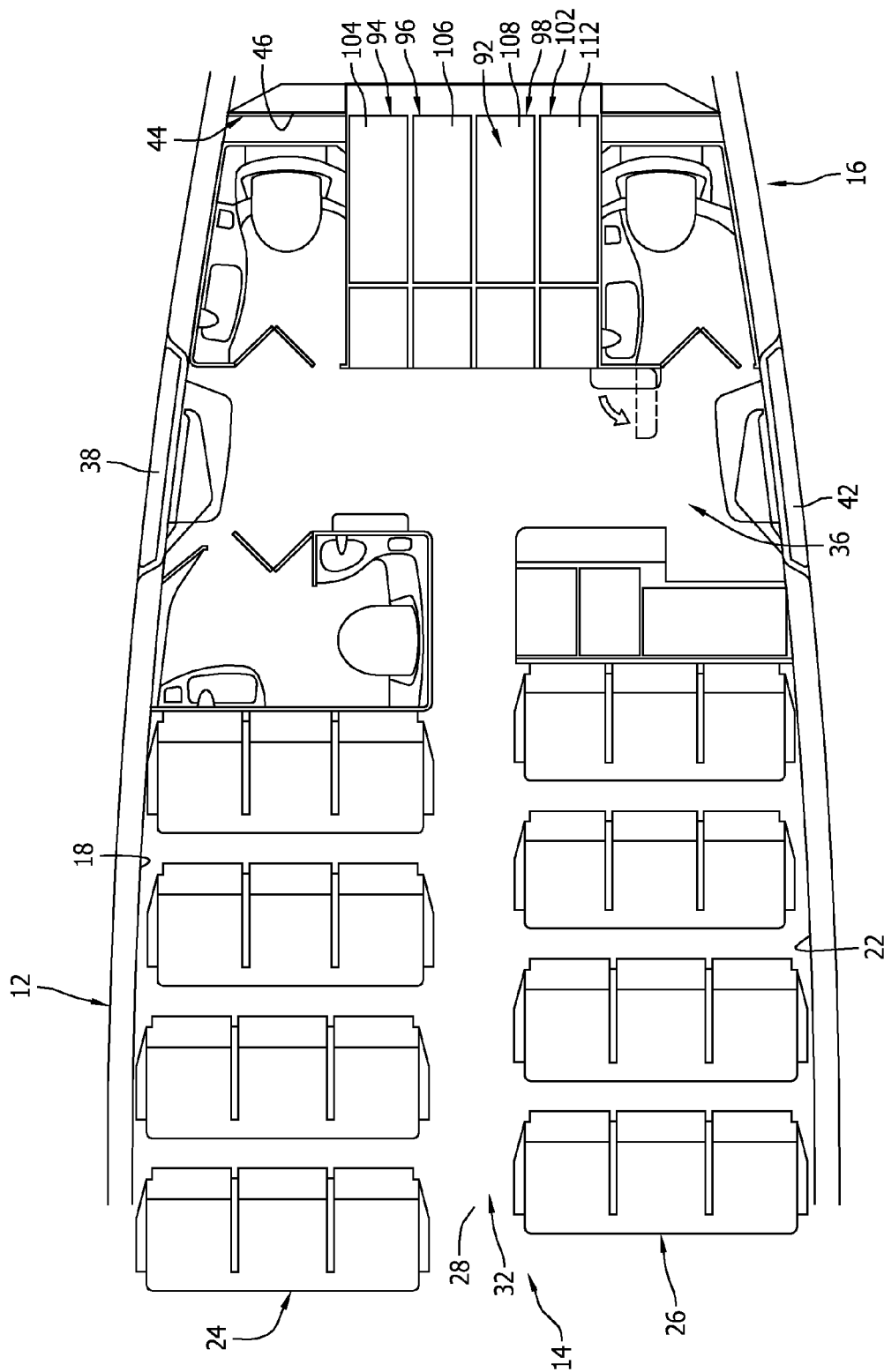
FIG. 1 is a representation of the floor plan at the rear of h the invention with the repositioned galley of the invention.

FIG. 1 is a representation of the floor plan at the rear of the aircraft of the invention with the repositioned galley of the invention. The aircraft cabin has a longitudinal length between a front 14 of the cabin and a rear 16 of the cabin. The cabin also has a lateral width between opposite first 18 and second 22 outboard sidewalls of the cabin.

A plurality of rows of seats 24, 26 are arranged on the floor surface 28 of the aircraft cabin. The rows of seats 24, 26 are arranged on laterally opposite sides of the cabin and define a central aisle 32. The aisle 32 extends longitudinally through the cabin across the floor surface 28 between the front 14 and rear 16 of the cabin and between the rows of seats 24, 26. Although only one aisle is shown extending the length of the cabin, there could be multiple aisles separating the rows of seats and extending through the length of the cabin.

A cross aisle 36 extends laterally across the rear 16 of the cabin. The cross aisle 36 may extend between a pair of aft most boarding doorways 38, 42 in the respective first 18 and second 22 sidewalls of the aircraft cabin. The aisle 32 extending between the rows of seats 24, 26 intersects the cross aisle 36. Thus, passengers boarding and exiting the aircraft through the aft boarding doorways 38, 42 walk along both the central aisle 32 and cross aisle 36.

Figure 2:
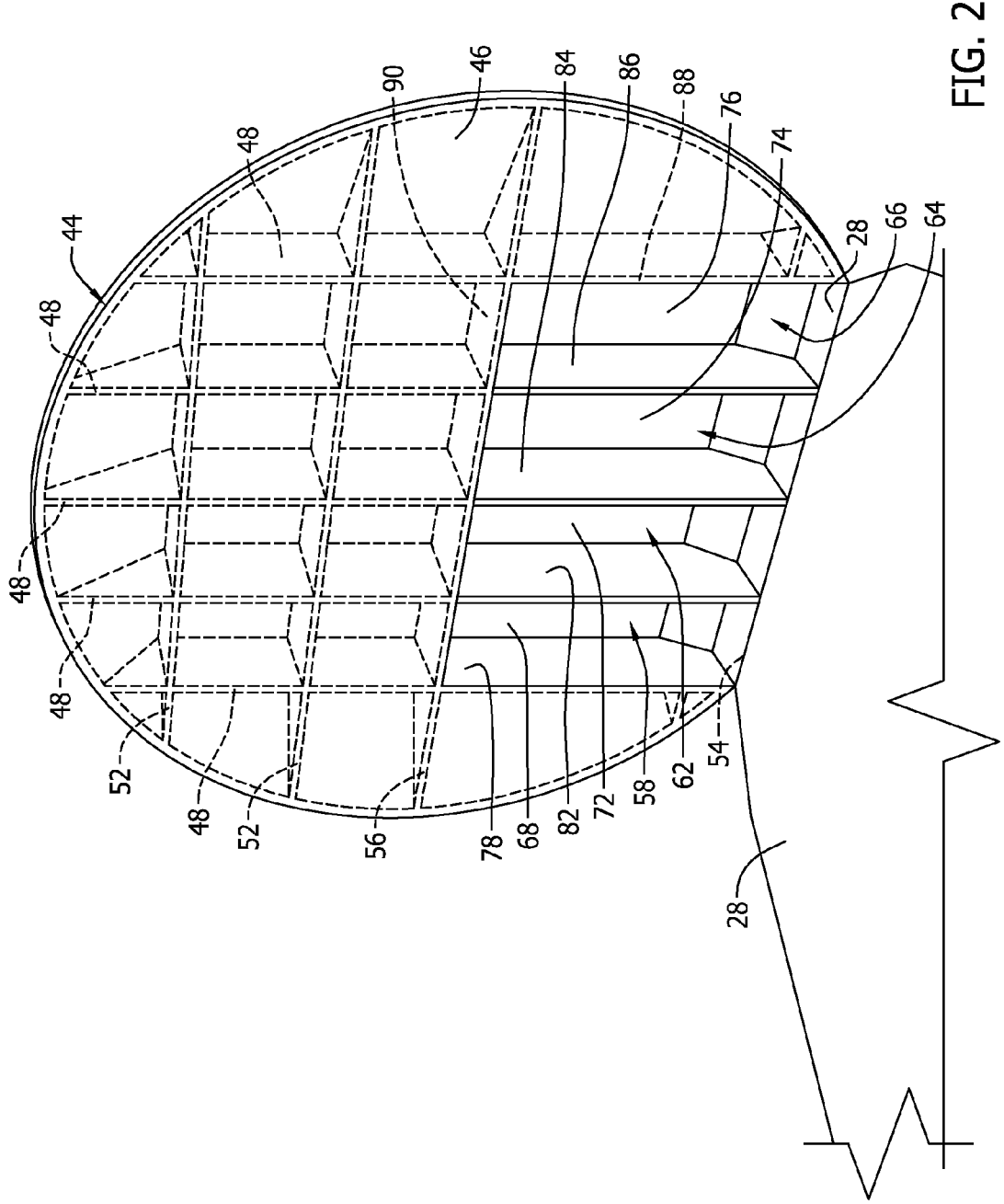
FIG. 2 is a partial perspective view of the aft pressure bulkhead of the invention and the floor surface of the aircraft cabin.

The aircraft may be provided with a modified aft pressure bulkhead 44. The bulkhead 44 may include a pressure wall and a interconnected support structure configured to attach to the aircraft fuselage barrel. In a preferred embodiment the pressure wall surface 46 may be continuous and extend vertically upwardly from the floor surface 28 and laterally across the rear of the aircraft cabin between the first 18 and second 22 outboard sidewalls of the aircraft cabin. Referring to FIG. 2, the aft pressure bulkhead 44 may comprise a plurality of vertically oriented support members or beams 48 that are secured to the top and bottom of the aircraft fuselage, and a plurality of horizontally oriented support members or beams 52 that are secured to the opposite sides of the aircraft fuselage. The interconnecting beams 48, 52 shown in FIG. 2 are also secured together, forming a rigid structural framework of the aft pressure bulkhead 44. The pressure wall 46 is preferably attached to the interconnected support structure to form a rigid pressure wall structure. The vertically oriented beams 48 may be spaced approximately 12 inches from each other. A lower horizontal beam 54 and a horizontal beam 56 immediately above the lower beam are spaced approximately 40 inches from each other. This spacing of the vertical beams 48 and the bottom two horizontal beams 54, 56 defines four upright rectangular, voids or volumes between the beams. In other embodiments of the aft pressure bulkhead the spacing distances between the beams could be varied and the number of voids left between the beams could be varied.

Figure 3:
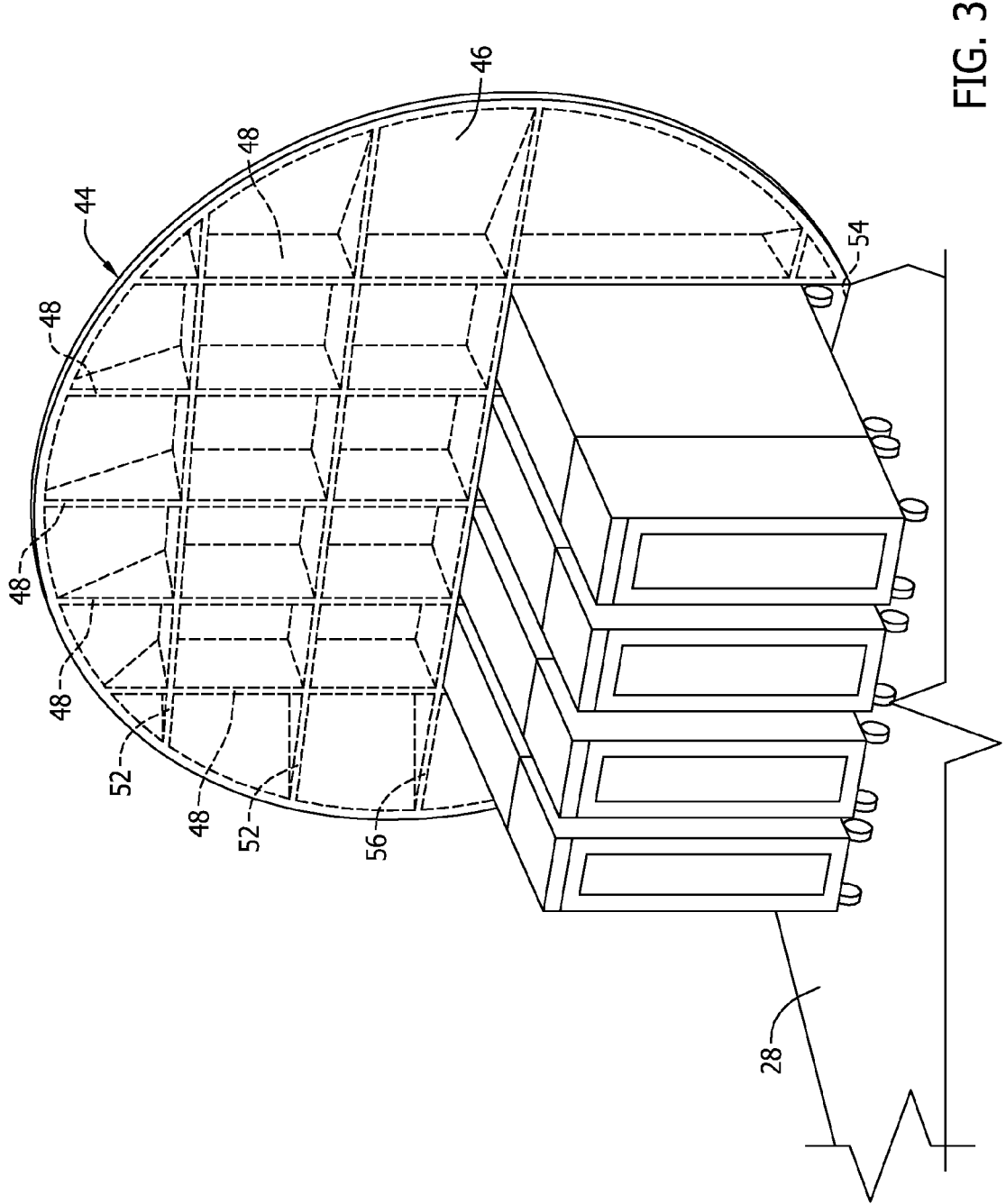
FIG. 3 is a view similar to FIG. 2, but showing galley carts inserted into the recessed cavity in the aft pressure bulkhead.

As shown in FIG. 3, the pressure wall surface 46 of the bulkhead has been modified with a large recessed chamber or cavity that extends rearwardly through a plane of the wall surface. The cavities 58, 62, 64, 66 extend rearwardly through a plane of the forward wall surface 46 to respective back walls 68, 72, 74, 76 of the cavities. Each of the cavities 58, 62, 64, 66 has the general upright rectangular orientation of the voids between the beams 48, 52 of the aft pressure bulkhead 44. The lateral sides of the cavities 58, 62, 64, 66 are defined by vertically oriented galley walls 78, 82, 84, 86, 88 that are comprised of portions of the vertical beams 48 of the bulkhead 44. Thus, the cavities 58, 62, 64, 66 are formed in the forward wall surface 46 of the aft pressure bulkhead 44 without compromising the structural integrity of the aft pressure bulkhead.

The cavities 58, 62, 64, 66 are formed in a central area of the wall surface 46 just above the floor surface 28 of the aircraft cabin. As shown in FIG. 2, a top panel 90 compromising one of the horizontal beams 56 extends over the cavities and a portion of the floor surface 92 extends rearwardly of the wall surface 46 and into the cavities 58, 62, 64, 66. The cavities 58, 62, 64,66 thereby increase the floor surface of the aircraft.

Referring to FIG. 2, the cavities 58, 62, 64, 66 are longitudinally aligned with a galley 92 of the aircraft cabin. The dimensions of the cavities 58, 62, 64, 66 correspond with those of galley cart compartments 94, 96, 98, 102 of the galley 92. As shown in FIG. 3, the cavities 58, 62, 64, 66 are dimensioned to receive rearward portions of four galley carts 104, 106,108, 112 that are rolled on the floor surfaces 28, 90 and into the cavities. This enables the galley 92 to be moved rearwardly in the aircraft cabin rear 16 increasing floor space in front of the galley. The galley 92 is positioned entirely rearwardly of the cross-aisle 36 and the aft most boarding doorways 38, 42 at the laterally opposite ends of the cross-aisle.

The rearward extension of the galley 92 into the cavities 58 62, 64 66 of the modified aft pressure bulkhead 44 increases the floor space 28 of the aircraft cabin and improves passenger access to the aft most boarding doors 38, 48 of the aircraft. The galley may further include a wall that extends adjacent to the aft bulkhead and extends into the cavities of the bulkhead.

Figure 4:
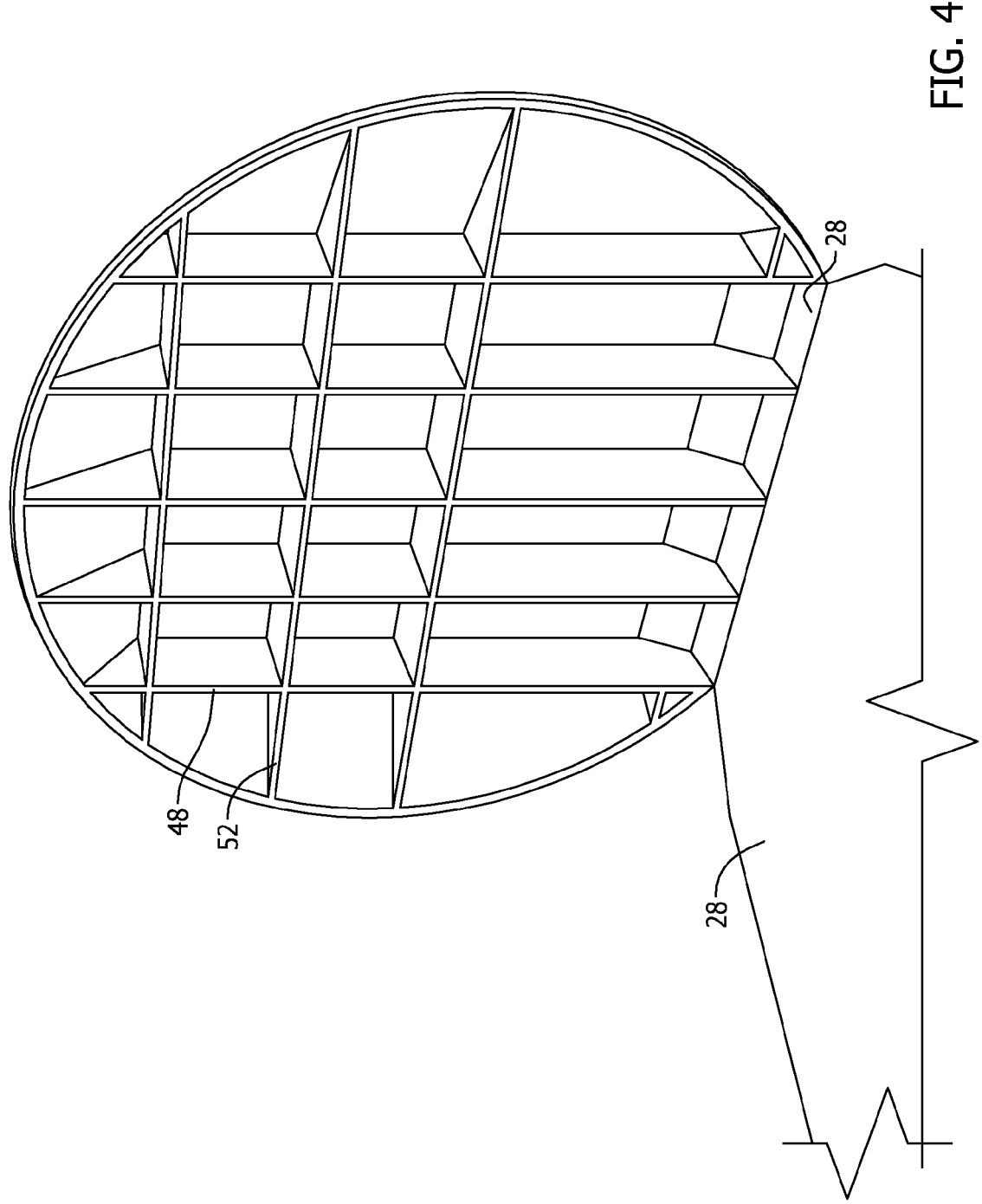
FIG. 4 is a partial perspective view of the aft pressure bulkhead of the invention and the floor surface of the aircraft cabin.
Figure 5:
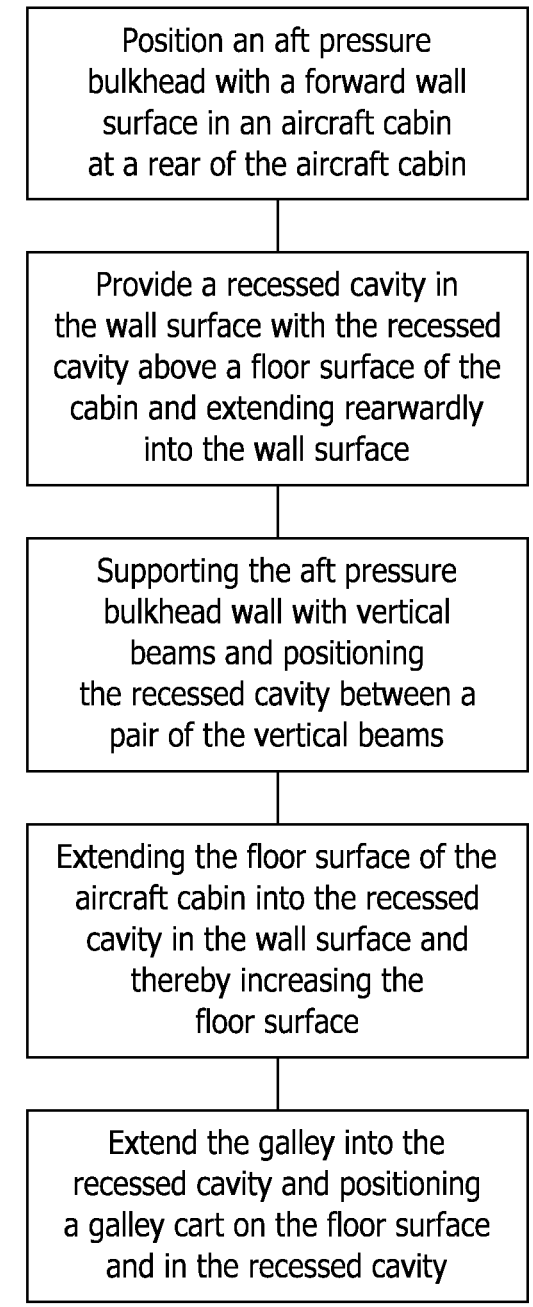
FIG. 5 is a flow chart representing a method of providing a recessed cavity in an aft pressure bulkhead to increase the floor space of an aircraft.

In a further embodiment of aft pressure bulkhead as shown in FIG. 4, the wall surface could be a rearward wall surface supported on the bulkhead beams 48, 52 behind the vertically oriented beams and horizontally oriented beams. In this configuration the wall may be substantially flat and continuous across the bulkhead area while the beams remain spaced apart to provide the needed volume for extending the floor space and positioning the galley carts.

As various modifications could be made in the construction of the invention herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An aircraft comprising:
an aircraft fuselage containing an aircraft cabin, the aircraft fuselage having a longitudinal length between a front of the aircraft fuselage and a rear of the aircraft fuselage, the aircraft cabin having a longitudinal length between a front of the aircraft cabin and a rear of the aircraft cabin, and the aircraft cabin having a lateral width between laterally opposite first and second outboard sidewalls of the aircraft cabin;
a floor surface in the aircraft cabin;
a galley in the rear of the aircraft cabin;
an aft pressure bulkhead at the rear of the aircraft cabin, the aft pressure bulkhead including a forward wall surface facing toward the aircraft cabin and extending laterally across the rear of the aircraft cabin between the first and second outboard sidewalls of the aircraft cabin, and the forward wall surface having a recessed cavity in a central area of the forward wall surface and above the floor surface, the cavity extending rearwardly of the forward wall surface and forming a portion of the galley; and,
the galley including a galley cart compartment containing at least one galley cart, the galley cart being supported on the floor surface and inserted longitudinally into the galley cart compartment, and at least a portion of the galley cart compartment extending into the recessed cavity in the central area of the forward wall surface.

2. The aircraft of claim 1, further comprising:
a portion of the galley cart in the galley cart compartment extending rearwardly into the recessed cavity in the aft pressure bulkhead forward wall surface.

3. The aircraft of claim 1, further comprising:
the galley having a pair of galley walls on laterally opposite sides of the galley with rearward portions of the pair of galley walls extending rearwardly through the aft pressure bulkhead forward wall surface and forming laterally opposite sides of the recessed cavity in the aft pressure bulkhead forward wall surface.

4. The aircraft of claim 1, further comprising:
the aft pressure bulkhead being a rigid, pressure sealed structure with vertical beams supporting the aft pressure bulkhead forward wall surface; and,
the recessed cavity extending rearwardly between a pair of the vertical beams supporting the aft pressure bulkhead forward wall surface.

5. A method of increasing the floor space in an aircraft cabin comprising:
positioning an aft pressure bulkhead at a rear of the aircraft cabin, the aft pressure bulkhead having a front wall surface extending across the aircraft cabin and extending upwardly from a floor surface of the aircraft cabin, the bulkhead having;
a recessed cavity in the wall surface, the recessed cavity extending rearwardly into the wall surface;
positioning the floor surface into the recessed cavity; and,
temporarily positioning a galley cart in the recessed cavity with a portion of the galley cart extending rearwardly of the aft pressure bulkhead wall surface.

6. The method of claim 5, further comprising:
extending the floor space rearwardly of the aft pressure bulkhead wall surface.

7. A method of increasing the floor space in an aircraft cabin comprising:
positioning an aft pressure bulkhead at a rear of the aircraft cabin, the aft pressure bulkhead having a front wall surface extending across the aircraft cabin and extending upwardly from a floor surface of the aircraft cabin, the bulkhead having;
a recessed cavity in the wall surface, the recessed cavity extending rearwardly into the wall surface;
positioning the floor surface into the recessed cavity; and,
supporting the aft pressure bulkhead wall surface with vertical beams and positioning the recessed cavity between a pair of the vertical beams.

8. An aircraft comprising:
a fuselage having a top and an opposite bottom, and the fuselage having a left side and a laterally opposite right side;
a cabin contained inside the fuselage, the cabin having a first side wall and a laterally opposite second side wall, and the cabin having a front and a longitudinally opposite rear;

an aft pressure bulkhead extending across the rear of the cabin between the fuselage top and bottom and the fuselage left and right sides, the aft pressure bulkhead including a first vertical beam and an adjacent second vertical beam that extend between the fuselage top and bottom, and a first horizontal beam and an adjacent second horizontal beam that extend between the fuselage left side and right side, the first and second vertical beams and the first and second horizontal beams being interconnected forming a rigid structural framework of the aft pressure bulkhead;

a pressure wall attached to the structural framework forming a rigid pressure wall structure; and, the interconnected first and second vertical beams and first and second horizontal beams defining an upright rectangular void inside the pressure wall structure and between the first and second vertical beams and the first and second horizontal beams, the void being accessible from the cabin and being dimensioned to receive a portion of a galley cart inside the void.

9. The aircraft of claim 8, further comprising:
the first and second vertical beams and the first and second horizontal beams being substantially orthogonal.

10. The aircraft of claim 8, further comprising:
the pressure wall being attached to a rear of the structural framework of the rigid pressure wall structure.

11. The aircraft of claim 8, further comprising:
the pressure wall being attached to a front of the structural framework of the rigid pressure wall structure.

12. The aircraft of claim 8, further comprising:
the pressure wall having a pressure wall surface that is substantially flat.

13. The aircraft of claim 8, further comprising:
the pressure wall having a pressure wall surface that is continuous, substantially flat and substantially orthogonal to the first and second vertical beams and the first and second horizontal beams.

14. The aircraft of claim 8, further comprising:
a galley in the cabin adjacent the aft pressure bulkhead, the galley having a galley floor surface that extends rearwardly into the void and between the first and second vertical beams and the first and second horizontal beams.

15. The aircraft of claim 14, further comprising:
the galley having a cavity, the cavity having laterally opposite and vertically oriented galley walls that extend rearwardly into the void.

16. The aircraft of claim 15, further comprising:
the galley walls being comprised of portions of the first and second vertical beams of the aft pressure bulkhead.

17. The aircraft of claim 15, further comprising:
a cavity extending rearwardly into the aft pressure bulkhead to a back wall of the cavity.

18. The aircraft of claim 14, further comprising:
the galley including a galley cart on the galley floor surface, the galley cart extending into the void between the first and second vertical beams and the first and second horizontal beams.

19. The aircraft of claim 8, further comprising:
the first and second vertical beams are two of a plurality of vertical beams and the first and second horizontal beams are two of a plurality of horizontal beams, the plurality of vertical beams and the plurality of horizontal beams being interconnected forming the rigid structural framework of the aft pressure bulkhead;
the interconnected plurality of vertical beams and plurality of horizontal beams defining a plurality of upright, rectangular voids inside the pressure wall structure, each void of the plurality of voids being dimensioned to receive a portion of a galley cart inside the void.

20. The aircraft of claim 19, further comprising:
a galley in the cabin adjacent the aft pressure bulkhead, the galley having a galley floor surface that extends into each void of the plurality of voids inside the pressure wall structure.

21. The aircraft of claim 20, further comprising:
the galley having a plurality of cavities, the cavities having laterally opposite and vertically oriented galley walls that extend rearwardly into the plurality of voids, the galley walls being comprised of portions of the vertical beams of the aft pressure bulkhead.

22. The aircraft of claim 21, further comprising:
a plurality of galley carts on the galley floor surface, each galley cart extending into a cavity of the plurality of cavities.

* * * * *